US008378520B2

(12) United States Patent  
Gehring et al.

(10) Patent No.: US 8,378,520 B2  
(45) Date of Patent: Feb. 19, 2013

(54) METHOD FOR ENERGY MANAGEMENT

(75) Inventors: Ottmar Gehring, Kernen (DE); Harro Heilmann, Osfildern (DE); Andreas Schwarzhaupt, Landau (DE); Erik Sieglin, Stuttgart (DE); Gernot Spiegelberg, Heimsheim (DE); Wolfgang Stahl, Oberboihingen (DE); Armin Sulzmann, Oftersheim (DE)

(73) Assignee: Daimlerchrysler AG, Suttgart (DE)

( * ) Notice: Subject to any disclaimer, the term of this patent is extended or adjusted under 35 U.S.C. 154(b) by 1871 days.

(21) Appl. No.: 10/569,826

(22) PCT Filed: Aug. 21, 2004

(86) PCT No.: PCT/EP2004/009380  
§ 371 (c)(1),  
(2), (4) Date: Aug. 8, 2006

(87) PCT Pub. No.: WO2005/028258  
PCT Pub. Date: Mar. 31, 2005

(65) Prior Publication Data  
US 2008/0197698 A1 Aug. 21, 2008

(30) Foreign Application Priority Data  
Sep. 11, 2003 (DE) ................................. 103 41 907

(51) Int. Cl.  
*H02J 3/14* (2006.01)
(52) U.S. Cl. ........................................................ 307/32
(58) Field of Classification Search ............... 307/32  
See application file for complete search history.

(56) References Cited

U.S. PATENT DOCUMENTS 6,465,908 B1 * 10/2002 Karuppana et al. ............. 307/31  
6,718,214 B1 4/2004 Schoettle et al.

FOREIGN PATENT DOCUMENTS

| DE | 199 60 079 A1 | 6/2000 |
| DE | 101 45 271 A1 | 4/2003 |
| EP | 0 992 400 A2 | 4/2000 |
| EP | 0 997 340 A1 | 5/2000 |
| EP | 1 293 388 A2 | 3/2003 |

OTHER PUBLICATIONS

Machine Translation of EP 1 293 388, http://translationportal.epo.org/emtp/translate, visited Sep. 27, 2011.*  
West, M.J. et al. "Predictive Control for Energy Management in All/More Electric Vehicles with Multiple Energy Storage Units", Conference Proceedings Article, vol. 1, Jun. 1, 2003, pp. 222-228.

* cited by examiner

*Primary Examiner* — Hal Kaplan  
(74) *Attorney, Agent, or Firm* — Fitch, Even, Tabin & Flannery, LLP

(57) ABSTRACT

The present invention discloses a method for energy management, by means of which significant fluctuations in the power consumption in the on-board electrical system are reduced, in particular, current consumption peaks arising due to a very high start-up current of electrical actuators and solenoid valves, are more evenly distributed over time. To achieve this, the method for energy management according to the invention operates predictively, i.e. it determines both the energy available in the subsequent time interval and the energy required on the basis of activation requests, and selects consumers to be activated according to their priority and a prevailing tolerance time within which a consumer must be activated following the submission of its activation request. The tolerance time is thereby continuously adapted.

8 Claims, 5 Drawing Sheets

METHOD FOR ENERGY MANAGEMENT

CROSS REFERENCE TO RELATED APPLICATION

This application is the National Stage filing under 35 U.S.C. 371 of International Application No. PCT/EP2004/009380, filed Aug. 21, 2004, and claims priority of German Patent Application 103 41 907.1, filed Sep. 11, 2003, the subject matter of which in its entirety, is incorporated herein by reference

BACKGROUND OF THE INVENTION

The invention relates to a method for energy management as claimed in claim 1.

Due to the increasing need for electrical energy in vehicles, for example due to drive-by-wire technology, and the resulting substantial fluctuations in the behavior through time of energy consumption, a method for energy management becomes increasingly important. In a method of this type, it must noted in particular that the capability of the system to deliver sufficient electrical energy at any time is to a significant extent relevant to safety.

For example, a method for activating and deactivating different classes of consumers by means of switching elements in the context of energy management performed by a control device, particularly in a motor vehicle, is known from DE 199 60 079 A1. The switching elements are controlled in such a way that the selected priorities for controlling the switching elements can be changed during operation, i.e. dynamically. Operating-mode-dependent adaptation of switching priorities during live operation is therefore possible. Consumers are deactivated by changing the switching priority in such a way that the perceptibility of the operating modes is suppressed as much possible. Priorities can also be changed here according to specifically customized criteria.

In this and other hitherto known methods for energy management, the problem exists that they are, inter alia, inadequate, given that, in the case of on-board electrical systems with one or two current circuits, an entire current circuit is deactivated in each case, or they are highly complex in terms of their logic and are subsequently difficult to expand. In methods of this type, consumers are often switched according to a statically or dynamically defined priority. Although this takes account very effectively of the aspect of operational reliability, the convenience and acceptance of the driver are only considered indirectly. For the driver, the time between the switching command and execution is of primary importance. Furthermore, in the method described above, energy management is only performed reactively, i.e. consumers are only deactivated once an energy shortfall has occurred. In this case, consumers such as electric motors have already started up and have imposed a load on the battery through the start-up current flow. It is not possible to control on-board electrical system components predicatively.

The object of the present invention is therefore to further develop a method for energy management of the generic type in such a way that predictive control of on-board electrical system components is possible, so that the imposition of a load on the battery by consumers which are to be deactivated immediately is avoided. Furthermore, the time span that elapses between the switching command and execution and the maximum time span that may elapse in the switching/activation sequence are to be directly taken into account.

SUMMARY OF THE INVENTION

This object is achieved according to the invention by a method for energy management with the characteristics as claimed in claim 1. Advantageous further developments of the invention are described in the subclaims.

In particular, predictive control of on-board electrical system components is possible through the method for energy management according to the invention. The amount of energy available in the subsequent time interval $\Delta t$ is continuously calculated for this purpose. The amount of energy that will be required in the subsequent time interval is determined from the requests to activate consumers. If more energy is required than is available, implementation of requests for activation is delayed, or specific consumers are deactivated. Substantial fluctuations in the power consumption in the on-board electrical system can be reduced due to the predictive mode of operation. This is possible, inter alia, since current consumption peaks arising due to the very high start-up current of electrical actuators and solenoid valves are more evenly distributed over time.

This and further objects, features and advantages of the present invention are made clear from the following detailed description of a preferred exemplary embodiment of the invention, which is described below in conjunction with the drawing.

BRIEF DESCRIPTION OF THE DRAWINGS

FIGS. 2-1 to 2-3 show a flow diagram of a subroutine of the method for energy management according to the invention shown in FIG. 1, and FIG. 3 shows a flow diagram of a further subroutine of the method for energy management according to the invention shown in FIG. 1.

A preferred exemplary embodiment of the method for energy management according to the invention is first described in more detail below with reference to FIG. 1.

DETAILED DESCRIPTION OF THE INVENTION

Figure 1:
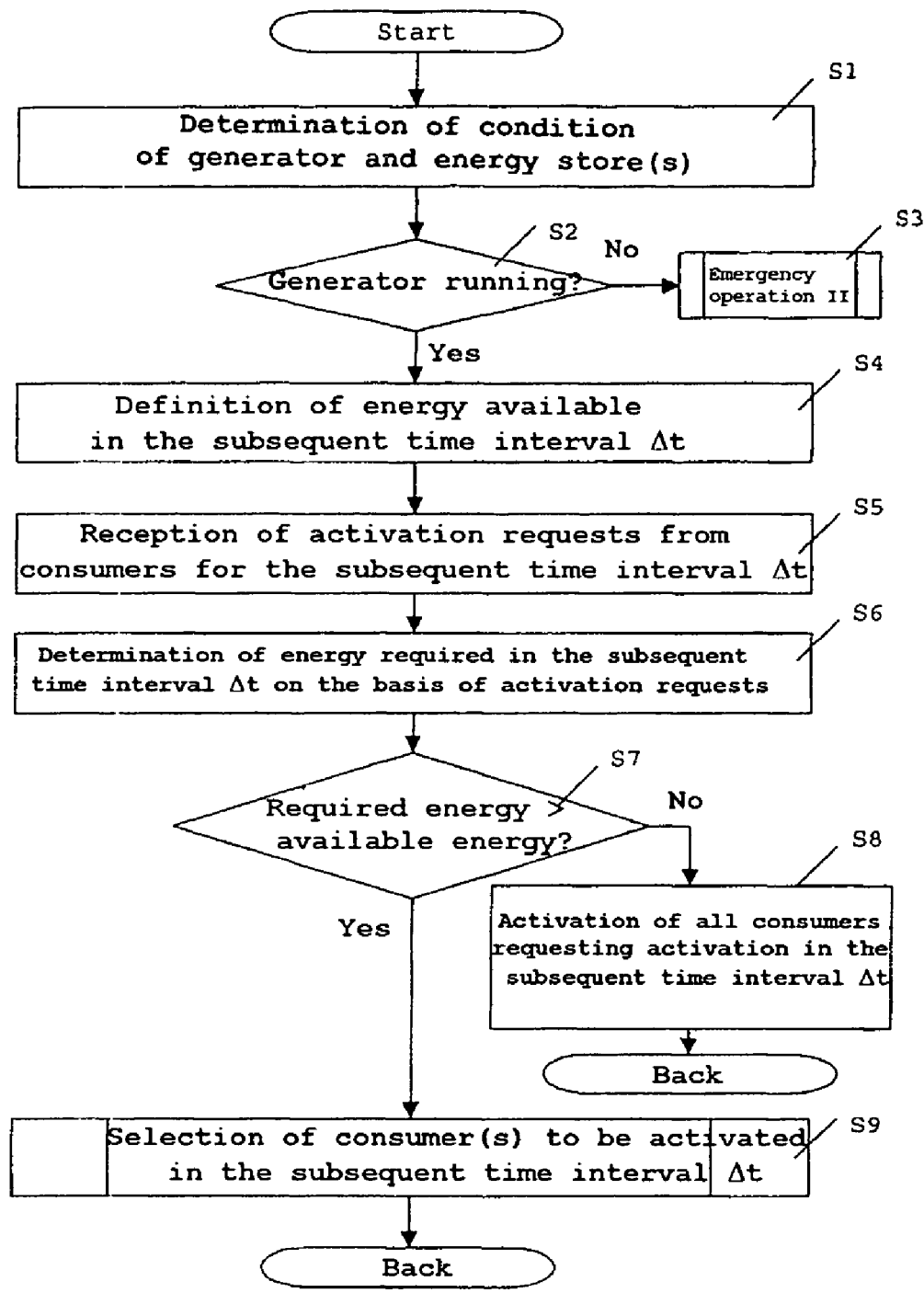
FIG. 1 shows a flow diagram of the method for energy management according to the invention.

FIG. 1 shows a flow diagram of a method for energy management according to the invention.

In contrast to existing energy management systems, in which intervention through de-activation of consumers only occurs once an energy shortfall has been identified, predictive control of on-board electrical system components is implemented in the method for energy management according to the invention. To do this, the condition of the generator and one or more energy stores is continuously determined in step S1. In step S2, these condition data are used to determine whether or not the generator is running. If it is identified in step S2 that the generator is not running, i.e. has failed, the procedure moves on to step S3, in which an emergency operation is initiated. The subroutine implementing this emergency operation is described in more detail below with reference to FIG. 3. If, on the other hand, it is identified in step S2 that the generator is running, the procedure moves on in normal operation to step S4, in which the amount of energy available in the subsequent time interval $\Delta t$ is determined using the condition data of the generator and energy store(s) determined in step S1.

In step S5, activation requests are then received from consumers requesting activation for the subsequent time interval $\Delta t$. In the subsequent step S6, the energy required in the subsequent time interval $\Delta t$ on the basis of the activation requests received from consumers in step S5 is determined. A check is then carried out in step S7 to determine whether the energy required on the basis of all activation requests determined in step S6 lies above the available energy determined in step S4. If not, i.e. it is established in step S7 that the available energy is sufficient to fulfill all activation requests, all consumers requesting activation are activated in step S8 in the subsequent time interval Δt. The procedure then returns to the start. However, if it is established in step S7 that the energy required to fulfill all activation requests from consumers is greater than the available energy, a subroutine is carried out in step S9, by means of which a selection of consumers that are to be activated in the subsequent time interval is made, after which the procedure returns to the start. Implementation of activation requests is delayed, or specific consumers are deactivated, in this subroutine in step S9. Significant fluctuations in the power consumption in the on-board electrical system can be reduced due to the predictive mode of operation. This is possible, since current consumption peaks arising due to the very high start-up current of electrical actuators and solenoid valves are more evenly distributed over time.

The subroutine according to step S9 is described in more detail below with reference to FIGS. 2-1 to 2-3, by means of which a selection is made of consumers that are to be activated in the subsequent time interval Δt.

The consumers are essentially divided up into a plurality of classes. Class I comprises non-switchable consumers, e.g. the engine management system. Class I consumers are immediately supplied with energy in any event. Class II consumers comprise conditionally switchable consumers, i.e. switchable consumers which have a safety relevance. Finally, consumers in classes III to N are switchable consumers which have no safety relevance and are divided up into a plurality of classes. The criterion for division into classes III to N is the inconvenience suffered by the driver as a result of failure. Consumers belonging to classes II to N are switched in the method for energy management according to the invention. Consumers can then be divided up into classes dynamically during driving operation, e.g. depending on external factors.

Figures 1, 2:
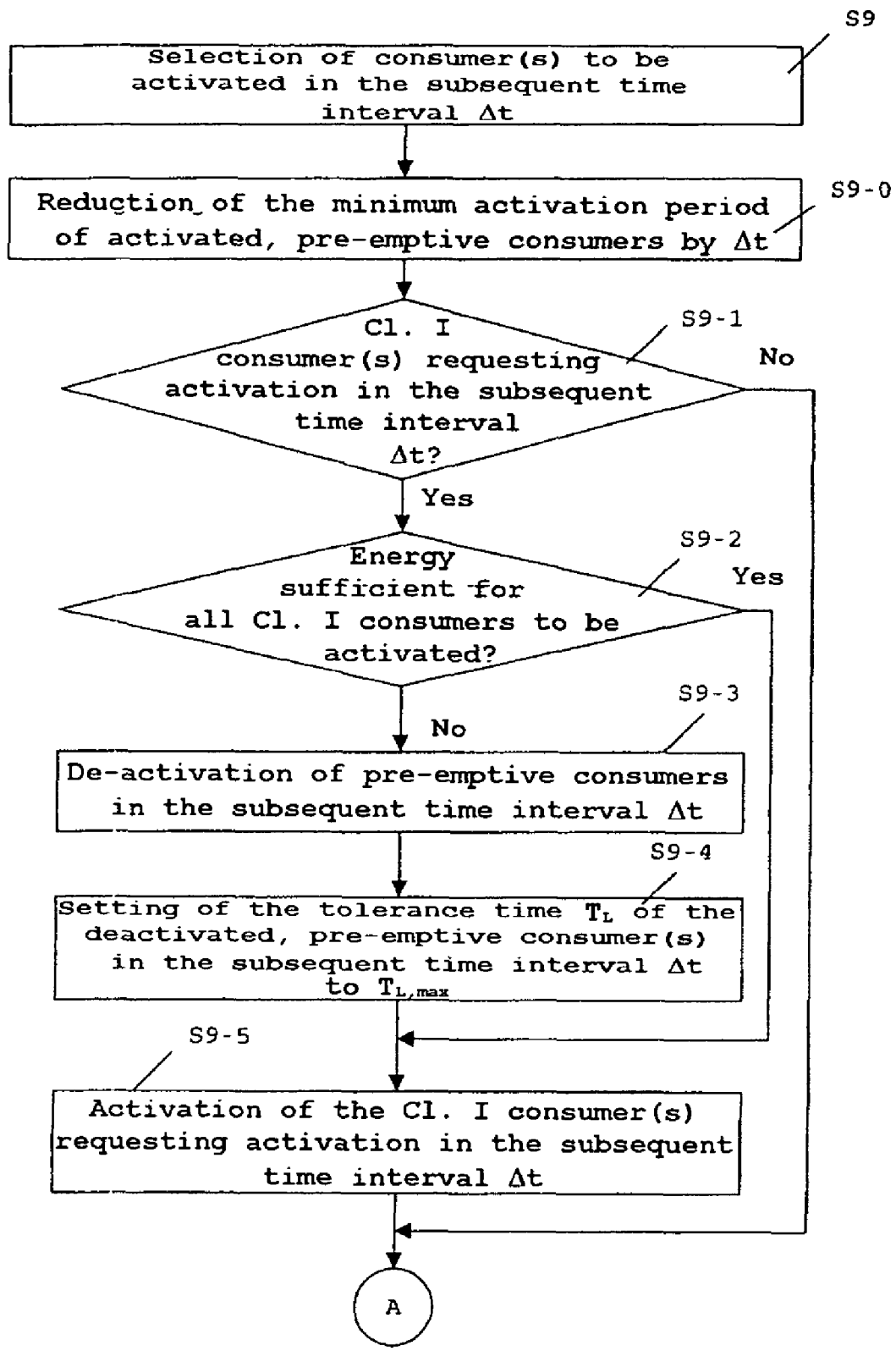
Figure 2:
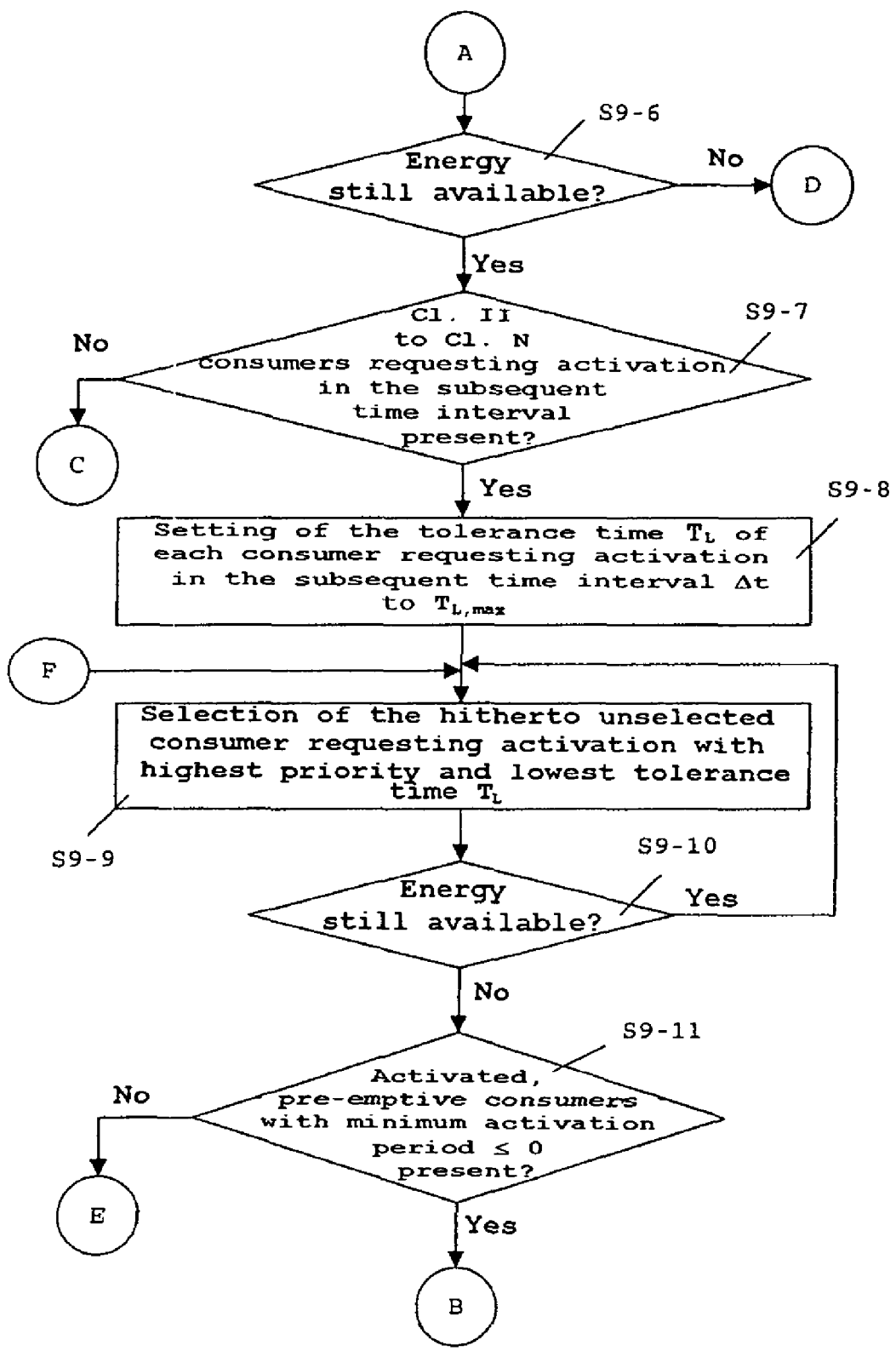
Figures 2, 3:
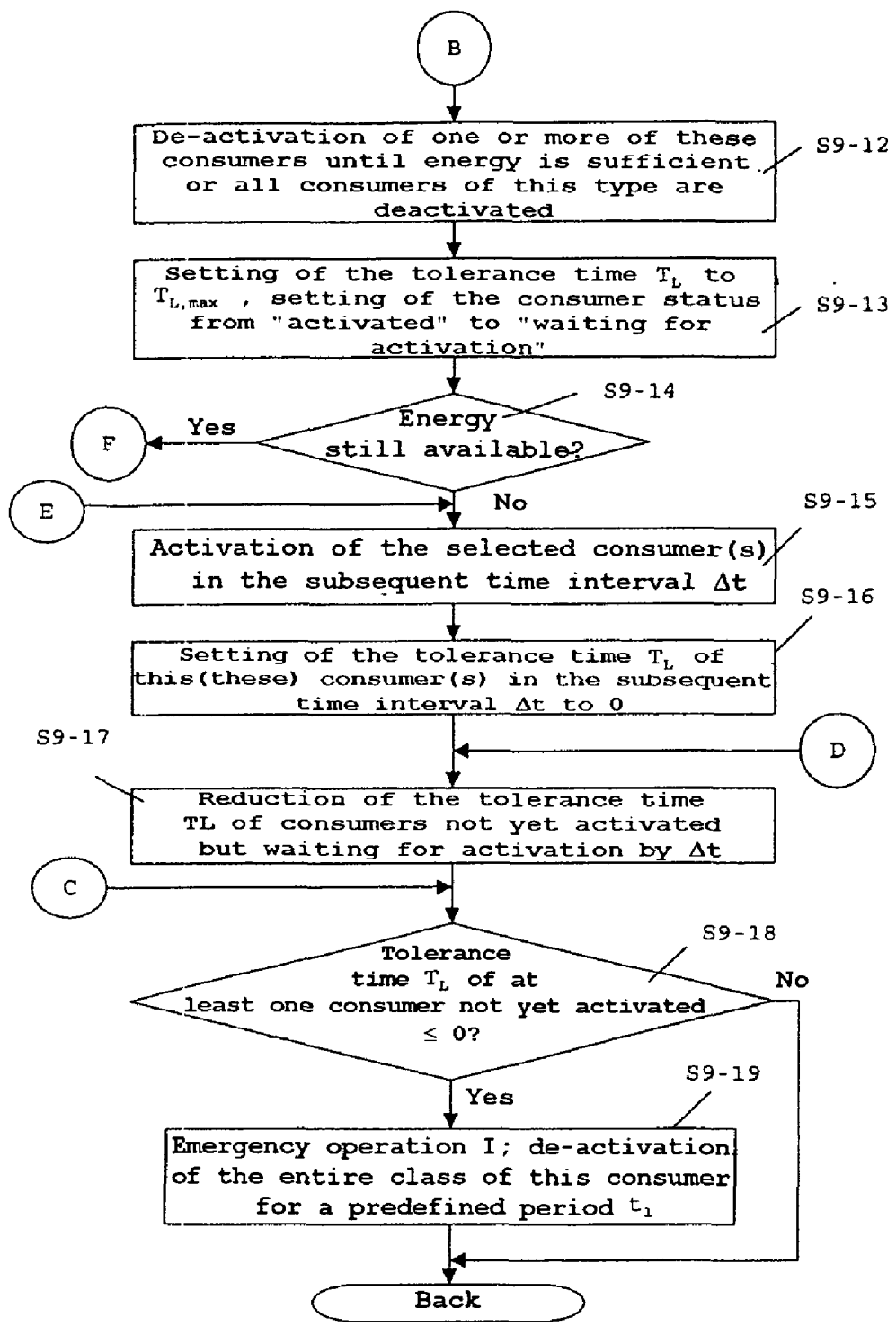
Figure 3:
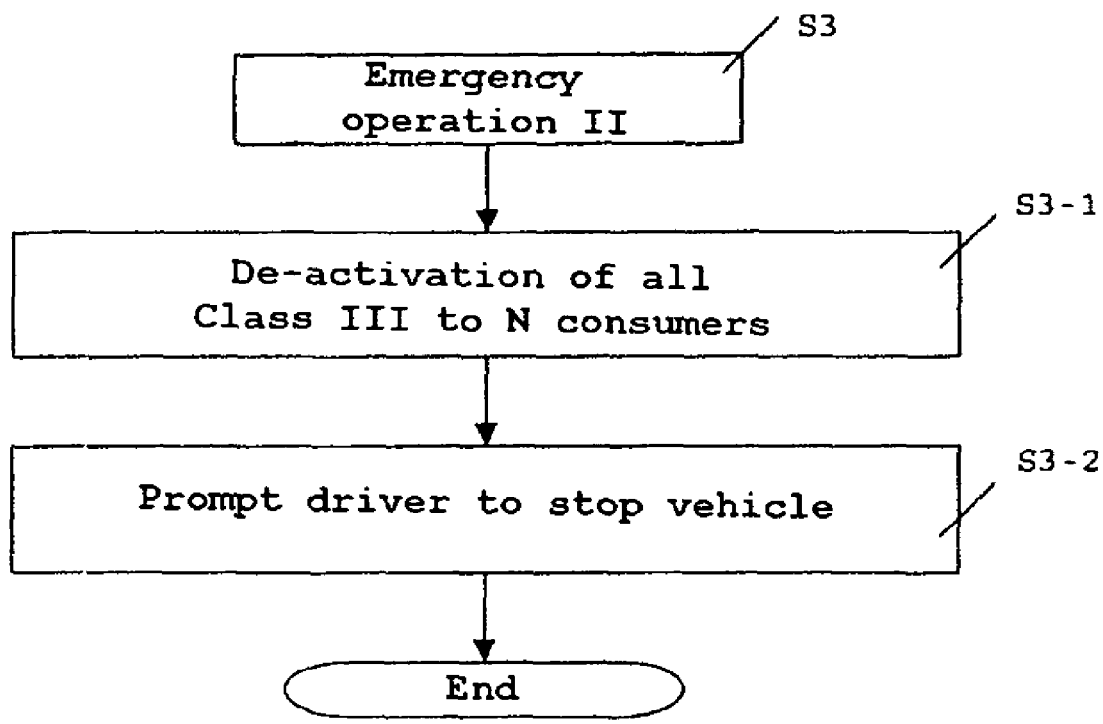

First of all, in the subroutine for the selection of consumers that are to be activated in the subsequent time interval Δt according to step S9 in FIG. 1, as shown in FIG. 2-1, a minimum activation period of activated, pre-emptive consumers is first reduced by a time interval Δt in step S9-0. A query is then performed in step S9-1 to ascertain whether there are any class I consumers requesting activation for the subsequent time interval Δt. Since class I consumers are non-switchable consumers with safety relevance, a check is carried out in step S9-2 to ascertain whether the available energy determined in step S4 is sufficient for the activation of all class I consumers requesting activation in the subsequent time interval Δt. If it is established in step S9-2 that the energy is sufficient for all class I consumers requesting activation, activation of the class I consumer(s) requesting activation is then carried out in step S9-5 in the subsequent time interval Δt. However, if it is established in step S9-2 that the available energy determined in step S4 is not sufficient for the activation of all class I consumers requesting activation in the subsequent time interval, one or more pre-emptive consumers are deactivated in the subsequent time interval Δt in step S9-3, depending on the extent of the energy shortfall.

"Pre-emptive" consumers are consumers which can be deactivated in an already activated condition. In step S9-4, the tolerance time $T_L$ of the deactivated, pre-emptive consumer(s) is set in the subsequent time interval Δt to the value for their maximum tolerance time $T_{L,max}$. Thus, they are taken into consideration in the energy management as a "non-pre-emptive" consumer, waiting to be activated. An example of a pre-emptive consumer is the seat heating. If it is activated, it can be deactivated at any time and must then be reactivated within its maximum tolerance time $T_{L,max}$.

In step S9-5, activation of the class I consumer(s) requesting activation is then carried out in the subsequent time interval Δt.

In a next step S9-6, a check is carried out to ascertain whether any energy remains following activation of the class I consumers. If so, a check is carried out in step S9-7 to ascertain whether there are any class II to N consumers requesting activation in the subsequent time interval Δt. If so, a tolerance time $T_L$ of each consumer requesting activation in the subsequent time interval Δt is set to a maximum tolerance time $T_{L,max}$, which may differ for each consumer in step S9-8. The maximum tolerance time $T_{L,max}$ corresponds to the maximum time period between the switching request for the electrical consumer and the actual activation that can be accepted from the perspective of safety or the perspective of driver convenience. The maximum tolerance times can be changed dynamically during driving operation, depending on e.g. driving conditions. The hitherto unselected consumer requesting activation with the highest priority, i.e. the lowest class, and the lowest tolerance time $T_L$, is then selected in step S9-9 for activation in the subsequent time interval Δt.

A check is then carried out in step S9-10 to ascertain whether energy is still available for a further activation in the subsequent time interval Δt. If so, the procedure returns to step S9-9 and the hitherto unselected consumer requesting activation with the highest priority and the lowest tolerance time $T_L$ is again selected. Steps S9-9 and S9-10 are repeated until it is recognized that no more energy remains or the energy is no longer sufficient for any activation. A check is then carried out in a step S9-11 to ascertain whether there are any activated, pre-emptive consumers with a minimum activation period equal to or less than 0. If not, the procedure moves on directly to step S9-15. However, if so, one or more of these pre-emptive consumers is deactivated in step S9-12 until the energy is sufficient or all consumers of this type have been deactivated. Then, in step S9-13, the tolerance time $T_L$ is set to a maximum tolerance time $T_{L,max}$ and the status of the pre-emptive consumer is set from "activated" to "waiting for activation". In the next step S9-14, a check is carried out to ascertain whether any more energy is available. If so, the procedure returns to step S9-9, otherwise it moves on to step S9-15. Steps S9-11 to S9-14 can be carried out optionally for consumers up to class II only. In step S9-15, the selected consumer(s) is(are) activated in the subsequent time interval Δt. In step S9-16, the tolerance time $T_L$ of the consumers activated in step S9-15 and that of the class I consumers activated in step S9-5 is then set to 0 in the subsequent time interval Δt.

Then, in step S9-17, either following on from step S9-16 or from step S9-6, if it was decided there that no more energy is available, the tolerance time $T_L$ of the consumers not yet activated but requesting activation is reduced by the time interval Δt. Furthermore, it is also optional in this step to increase the priority of the consumer gradually up to a maximum of class III, so that the probability of its activation in the next but one time interval Δt is increased and it does not have to wait a disproportionately long time for its activation due to numerous lower-class, higher-priority activation requests.

A check is then carried out in step S9-18 to ascertain whether, in particular due to the reduction of the tolerance time $T_L$ in step S9-17, the tolerance time $T_L$ of at least one consumer not yet activated is equal to or less than zero. If not, the procedure returns to the start. However, if it is established in step S9-18 that the tolerance time $T_L$ of at least one consumer not yet activated but requesting activation is equal to or less than zero, a first emergency operation I is initiated in step S9-19, in which the entire class of the consumer not yet activated but requesting activation, whose tolerance time $T_L$ is equal to or less than 0, is deactivated for a predefined time period $t_1$.

The procedure then returns to the start.

In addition, an emergency operation II is provided in step S3 in FIG. 1, in the event that it is recognized in step S2 that the generator is not running. The procedure involved in this "emergency operation II" subroutine is shown in FIG. 3. If, in step S3, the procedure switches over to the "emergency operation II" subroutine, all class III to N consumers, i.e. all consumers that do not belong to either the non-switchable or the conditionally switchable and therefore safety-relevant classes, are deactivated in step S3-1. In order to avoid endangering the driver, the latter is then prompted in step S3-2 to stop the vehicle as quickly as possible. The procedure then ends.

Since it is ensured in both the emergency operation I in step S9-15 and the emergency operation II in steps S3, S3-1 and S3-2 that switchable and conditionally switchable consumers, i.e. class I and II consumers, continue to be switched depending on their tolerance time $T_L$, danger to the driver due to failures of energy stores and/or the generator is excluded as far as possible. Due to the continued switching of class II consumers depending on their tolerance time $T_L$, consumption peaks are avoided and the load imposed on the energy store(s), for example the battery/batteries, is reduced. This results in a faster recovery of the energy store(s), for example the battery/batteries. Particularly in the emergency operation II, operation with the energy still stored in the energy store(s), for example the battery/batteries, is longer than would be the case without the intervention of energy management.

The invention claimed is:

1. A method for energy management, in particular for the energy management of the on-board electrical system of a vehicle with a generator, at least one energy store and consumers, including pre-emptive consumers that can be deactivated when in an already activated condition, which consumers can be divided up into a plurality of classes including class I containing non-switchable consumers, class II containing conditionally switchable consumers having a safety relevance and classes III to N containing switchable consumers having no safety relevance, with the following steps:
   (1) determining condition of the generator and energy stores
   (2) defining energy available in a subsequent time interval Δt from the determined condition of the generator and energy store(s),
   (3) receiving activation requests from consumers for the subsequent time interval Δt,
   (4) determining energy required in the subsequent time interval Δt on the basis of activation requests,
   (5) checking whether the required energy is greater than the available energy,
   (6) if the available energy is sufficient,
      fulfilling all activation requests of the consumers in the subsequent time interval, or
      if the available energy is not sufficient, selecting the consumer(s) to be activated in the subsequent time interval Δt according to the energy available and a priority and tolerance time ($T_L$) of the corresponding selected consumers; and
   wherein the selection of the consumer(s) to be activated in the subsequent time interval Δt comprises the following steps:

(a) reducing the minimum activation period of activated, pre-emptive consumers by a time interval Δt,
   (b) checking whether non-switchable consumers are requesting activation,
   (c) if non-switchable consumers are requesting activation, checking whether the available energy is sufficient for all non-switchable consumers requesting activation,
   (d) if available energy is not sufficient, deactivating pre-emptive consumers in the subsequent time interval Δt and setting of a tolerance time ($T_L$) of the deactivated, pre-emptive consumer(s) in the subsequent time interval to a maximum tolerance time ($T_{L,max}$), then similarly if the available energy is sufficient for all non-switchable consumers requesting activation, activating the conditionally switchable consumer(s) requesting activation in the subsequent time interval Δt,
   (e) if no non-switchable consumers are requesting activation or, following activation of the non-switchable consumer(s) requesting activation, checking whether energy is still available,
   (f) if energy is still available, checking whether consumers of different classes that are switchable and conditionally switchable in the subsequent time interval are requesting activation in the subsequent time interval,
   (g) if consumers of different classes that are switchable and conditionally switchable in the subsequent time interval are requesting activation in the subsequent time interval, setting a tolerance time ($T_L$) of each consumer requesting activation in the subsequent time interval to a maximum tolerance time ($T_{L,max}$), and selecting a hitherto unselected consumer requesting activation with the lowest class (highest priority) and the lowest tolerance time ($T_L$) until no more energy is available,
   (h) checking whether activated, pre-emptive consumers with a minimum activation period equal to or less than zero are available,
   (i) if activated, pre-emptive consumers with a minimum activation period equal to or less than zero are available, deactivating one or more of these consumers until the energy is sufficient or all consumers of this type are deactivated, then setting the tolerance time ($T_L$) to a maximum tolerance time ($T_{L,max}$) and setting the consumer status from "activated" to "waiting for activation",
   (j) checking whether energy is still available, and, if energy is still available, returning to step (g),
   (k) if no more energy is available, or if no activated, pre-emptive consumer with a minimum activation period equal to or less than zero is available,
      activating the selected consumer(s) in the subsequent time interval and setting the tolerance time ($T_L$) of this/these consumer(s) in the subsequent time interval Δt to 0, and,
   (l) if the activating of the selected consumer(s) is carried out or it has been established that no more energy is available for activation of switchable consumers, reducing the tolerance time ($T_L$) of consumers not yet activated but waiting for activation by Δt.

2. The method for energy management as claimed in claim 1, wherein, if no switchable consumers are requesting activation or the tolerance time ($T_L$) of consumers not yet activated but waiting for activation has been reduced, checking whether the tolerance time ($T_L$) of at least one of the consumers requesting activation but not yet activated is equal to or less than 0, and,
   if not, returning to step (1), otherwise switching over to an emergency operation, in which an entire class of the consumer requesting activation but not yet activated is deactivated for a predefined time period ($t_1$).

3. The method for energy management as claimed in claim 1, wherein steps (h) to (j) are carried out only for class II consumers requesting activation.

4. The method for energy management as claimed in claim 1, wherein the maximum tolerance times ($T_{L,max}$) can be changed dynamically during driving operation of the vehicle.

5. The method for energy management as claimed in claim 3, wherein the maximum tolerance times ($T_{L,max}$) can be changed depending on driving conditions of the vehicle.

6. The method for energy management as claimed in claim 1, wherein it is additionally established on the basis of determined data relating to the condition of the generator whether the generator is running and, if so, the defining of available energy in step (2) continues, otherwise switchover takes place to an emergency operation, in which all switchable consumers are deactivated and vehicle driver is then prompted to stop the vehicle.

7. The method for energy management as claimed in claim 1, wherein the consumers can be divided up into classes dynamically during driving operation of the vehicle.

8. The method for energy management as claimed in claim 7, wherein dynamic division of consumers is dependent on external factors.

* * * * *